United States Patent
Evans

(10) Patent No.: US 9,815,744 B2
(45) Date of Patent: Nov. 14, 2017

(54) PH ADJUSTED BETAINE BASED ORGANIC FERTILIZER

(71) Applicant: True Organic Products, Inc., Helm, CA (US)

(72) Inventor: Jacob Matthew Evans, Pebble Beach, CA (US)

(73) Assignee: True Organic Products, Inc., Helm, CA (US)

( * ) Notice: Subject to any disclaimer, the term of this patent is extended or adjusted under 35 U.S.C. 154(b) by 39 days.

(21) Appl. No.: 14/863,984

(22) Filed: Sep. 24, 2015

(65) Prior Publication Data

US 2017/0088475 A1 Mar. 30, 2017

(51) Int. Cl.
| | |
|---|---|
| C05C 11/00 | (2006.01) |
| C05G 3/00 | (2006.01) |
| C05F 5/00 | (2006.01) |
| C05F 11/00 | (2006.01) |

(52) U.S. Cl.
CPC .............. *C05C 11/00* (2013.01); *C05F 5/004* (2013.01); *C05F 5/006* (2013.01); *C05F 11/00* (2013.01); *C05G 3/00* (2013.01)

(58) Field of Classification Search
CPC .................................. C05C 11/00; C05G 3/00
See application file for complete search history.

(56) References Cited

U.S. PATENT DOCUMENTS

| | | | |
|---|---|---|---|
| 1,501,916 A | 7/1924 | Nikaido | |
| 1,599,185 A | 9/1926 | Reich | |
| 1,631,252 A | 6/1927 | Dickerson | |
| 2,049,524 A | 8/1936 | Stillwell | |
| 2,117,087 A | 5/1938 | Formhals | |
| 2,315,422 A | 3/1943 | Hildebrandt | |
| 2,626,237 A | 1/1953 | Warren | |
| 2,738,264 A | 3/1956 | Watson | |
| 2,797,986 A | 7/1957 | Zirm | |
| 3,445,220 A | 5/1969 | Anderson | |
| 3,983,255 A | 9/1976 | Bass | |
| 4,126,439 A | 11/1978 | Stekoll | |
| 4,230,485 A | 10/1980 | Ohlrogge | |

(Continued)

FOREIGN PATENT DOCUMENTS

| | | |
|---|---|---|
| CN | 102391030 | 3/2012 |
| CN | 102674972 | 9/2012 |

(Continued)

OTHER PUBLICATIONS

DuPont. Novel Betaine, Industrial Processing & Personal Care. Natural Betaine in Personal Care. Jan. 2012 pp. 1-20.*

(Continued)

*Primary Examiner* — Jennifer A Smith
(74) *Attorney, Agent, or Firm* — Hawley Troxell Ennis & Hawley LLP; Philip McKay

(57) ABSTRACT

An organic fertilization method is provided using a pH adjusted betaine based organic fertilizer product. The pH adjusted betaine based organic fertilizer product is created by combining betaine and pH adjusting material and optionally heating, optionally filtering, and optionally cooling the combination of betaine and pH adjusting material. The pH adjusted betaine based organic fertilizer product is applied to agricultural vegetation in one of multiple forms and by one of multiple methods.

50 Claims, 4 Drawing Sheets

(56) References Cited

U.S. PATENT DOCUMENTS

| | | | |
|---|---|---|---|
| 4,383,846 A | 5/1983 | Newsom | |
| 4,424,151 A | 1/1984 | Grealy et al. | |
| 4,604,125 A | 8/1986 | Robertiello et al. | |
| 4,743,287 A | 5/1988 | Robinson | |
| 4,997,469 A | 3/1991 | Moore | |
| 5,177,008 A | 1/1993 | Kampen | |
| 5,177,009 A | 1/1993 | Kampen | |
| 5,221,313 A * | 6/1993 | Mortvedt | C05D 9/02 504/361 |
| 5,393,318 A | 2/1995 | Iizuka et al. | |
| 5,631,001 A | 5/1997 | Harich et al. | |
| 5,772,721 A | 6/1998 | Kazemzadeh | |
| 5,851,953 A | 12/1998 | Pehu et al. | |
| 5,952,267 A | 9/1999 | Mottram | |
| 6,083,293 A | 7/2000 | Bath | |
| 6,174,472 B1 | 1/2001 | Johnson et al. | |
| 6,241,795 B1 | 6/2001 | Svec et al. | |
| 6,318,023 B1 | 11/2001 | Yamashita | |
| 6,352,569 B1 | 3/2002 | Beran et al. | |
| 6,384,266 B1 | 5/2002 | Farone et al. | |
| 6,468,562 B2 | 10/2002 | Moilanen et al. | |
| 6,524,600 B2 | 2/2003 | Yamashita | |
| 6,572,669 B1 | 6/2003 | Creech | |
| 6,602,824 B1 | 8/2003 | Miles et al. | |
| 7,018,669 B2 | 3/2006 | Kosaka et al. | |
| 7,045,165 B2 | 5/2006 | Westberg | |
| 7,074,251 B1 | 7/2006 | Rogers et al. | |
| 7,901,481 B2 | 3/2011 | Evans | |
| 7,927,397 B1 | 4/2011 | Evans | |
| 8,444,742 B2 | 5/2013 | Smith et al. | |
| 2002/0048605 A1 | 4/2002 | Moilanen et al. | |
| 2003/0066322 A1 | 4/2003 | Perriello | |
| 2003/0172697 A1 | 9/2003 | Sower | |
| 2004/0035162 A1 | 2/2004 | Williams et al. | |
| 2004/0062832 A1 | 4/2004 | Kemp | |
| 2004/0065127 A1 | 4/2004 | Connell | |
| 2004/0121914 A1 | 6/2004 | Catalano | |
| 2005/0119127 A1 | 6/2005 | Cambri et al. | |
| 2006/0228323 A1 * | 10/2006 | Novelle | A01N 25/22 424/76.2 |
| 2006/0243009 A1 | 11/2006 | Burnham | |
| 2006/0254331 A1 | 11/2006 | Burnham | |
| 2007/0261451 A1 | 11/2007 | Beckley et al. | |
| 2007/0292564 A1 * | 12/2007 | Hu | A23K 10/30 426/31 |
| 2012/0028801 A1 * | 2/2012 | Daniels | A01N 65/44 504/117 |
| 2013/0130902 A1 | 5/2013 | Roose et al. | |
| 2014/0047881 A1 | 2/2014 | Roberts | |

FOREIGN PATENT DOCUMENTS

| | | |
|---|---|---|
| CN | 102875238 | 1/2013 |
| CN | 103524175 | 1/2014 |
| CN | 103724128 | 4/2014 |
| CN | 103936500 | 7/2014 |
| CN | 104058810 | 9/2014 |
| CN | 104151018 | 11/2014 |
| CN | 104291971 | 1/2015 |
| CN | 104303670 | 1/2015 |
| DE | 4324823 | 2/1994 |
| EP | 0411780 | 2/1991 |
| GB | 663133 | 12/1951 |
| JP | 63-107907 | 5/1988 |
| JP | 01208386 | 8/1989 |
| JP | 06107511 | 4/1994 |
| JP | 2004-113032 | 4/2004 |
| JP | 2004-168614 | 6/2004 |
| JP | 4757447 | 8/2011 |
| KR | 100839201 | 6/2008 |
| KR | 101361521 | 2/2014 |
| PL | 159135 | 11/1992 |

OTHER PUBLICATIONS

Wiedmeier et al., "Effects of Concentrated Separator Dried Beet Pulp on Nutrient Digestibility, Milk Production, and Preference of Holstein Cattle", Journal of Dairy Science, 1994, vol. 77, No. 10, pp. 3051-3057.

Kearney et al., "Raw Juice Chromatographic Separation Process", Proceedings from the 28th Biennial ASSBT Meeting, Operations, New Orleans, LA, Mar. 8-11, 1995, Amalgamated Research, Inc., pp. 1-5.

Midwest AGRI Commodities, "Raffinate (Desugared Beet Molasses)", Jul. 10, 2001, 1 page.

Diaz-Zorita, "Applications of Foliar Fertilizers Containing Glycinebetaine Improve Wheat Yields," Argentina Journal of Agronomy and Crop Science (Impact Factor: 2.62), Dec. 2001; 186(3): 209-215.

Decloux et al. "Interest of electrodialysis to reduce potassium level in vinasses." Desalination 146 (2002) pp. 393-398.

Naidu, et al., "Glycinebetaine foliar application increases pasture winter growth and milk yield," Proceedings of the 11th Australian Agronomy Conference, Feb. 2-6, 2003, 2 pages, Geelong, Victoria.

Evans, Analytical Data, 2004-2006.

Evans, "Concentrated Separator By-Product Based Fertilizer," U.S. Appl. No. 12/931,323, filed Jan. 27, 2011.

Gao, et al., "Effect of spraying glycine betaine on physiological responses of processing tomato under drought stress," Journal of Plant Nutrition and Fertilizer, 2012, 18(2): 426-432.

"Betaine Plant Fertilizer, Betaine Plant Fertilizer Suppliers and Manufacturers at Alibaba.com," [online], [retrieved Feb. 24, 2015]. Retrieved from the internet <URL: http://www.alibaba.com/showroom/betaine-plant-fertilizer.htm>.

Evans, "Betaine Based Organic Fertilizer," U.S. Appl. No. 14/690,621, filed Apr. 20, 2015.

Evans, "Betaine Based Organic Fertilizer," U.S. Appl. No. 14/820,033, filed Aug. 6, 2015.

Evans, "Organic Fertilizer From Anaerobic Digestate and Stabilized Liquid Fish Product," U.S. Appl. No. 15/098,040, filed Apr. 13, 2016.

Evans, "PH Adjusted Organic Fertilizer From Anaerobic Digestate and Grain By-Products," U.S. Appl. No. 15/098,120, filed Apr. 13, 2016.

Evans, "Fish Soluble By-Product and Grain By-Product Based Organic Fertilizer," U.S. Appl. No. 15/150,047, filed May 9, 2016.

Evans, "Fish By-Product Based Organic Fertilizer," U.S. Appl. No. 15/152,330, filed May 11, 2016.

\* cited by examiner

PH ADJUSTED BETAINE BASED ORGANIC FERTILIZER

BACKGROUND

Over the years, a number of different types of fertilizer compositions have been developed and employed in agriculture. In the recent past, synthetic chemical fertilizer compositions dominated the fertilizer marketplace. More recently, however, the public has become increasingly aware and concerned about the links between synthetic chemical fertilizer use, environmental degradation, and human illness. For instance, the public has recently become more aware that synthetic chemical fertilizers contain poisons, pollute water, destroy microbes in the soil, lose half their value due to runoff, burn roots, require significant amounts of water, contain less micro-nutrition, and are heavily laden with salt.

Consequently, there has been a significant movement toward fertilizer compositions that are suitable for use in United States Department of Agriculture certified organic crop production. These fertilizer compositions are typically derived from natural sources and do not rely on synthetic chemicals. Unlike synthetic products, organic fertilizers encourage the growth of micro-organisms, which break down old plant material and convert nutrients into food. Consequently, over time, the use of organic fertilizers results in healthier and more fertile soil, which leads to hardier and more robust plants.

Furthermore, consumers are more concerned about health and the environment than ever before and are making purchasing decisions based upon those concerns. As a result, more and more consumers are purchasing organic foods. Studies show that many consumers who purchase organic foods do so because they wish to avoid toxic and persistent pesticides and fertilizers.

As a result of the increased demand for organic fertilizer compositions, there is significant interest in developing better organic fertilizer compositions that provide nutrients and reduce the risk of introducing pathogens into the food supply.

Desirable nutrients include, but are not limited to, bioavailable phosphorous, potassium, and nitrogen. These nutrients must not only be present in the fertilizer, but also must be present in sufficient concentrations to benefit agricultural vegetation. In addition, the organic fertilizer compositions must be in a form that is readily applied to the agricultural vegetation and/or has minimum impact on the surrounding community. To this end, the desirable characteristics of organic fertilizer compositions include, but are not limited to, the following: the ability to directly apply the organic fertilizer compositions in a low viscosity liquid form; the ability to inject and/or add the organic fertilizer compositions into irrigation streams; time-released nitrogen components, which become bioavailable to agricultural vegetation by beneficial microbial digestion in soil; minimized chemical crop burning; minimal odor associated with the organic fertilizer composition during and/or after application; and minimized undesirable runoff.

In an effort to find a cost-efficient organic fertilizer composition, numerous attempts have been made to utilize waste products generated by fermentation and/or refined sugar processing as an organic fertilizer composition. These attempts have included deriving organic fertilizer compositions from malt extracts and/or spent grain liquor; treating molasses to recover potassium and nitrogen in solid form for use as an organic fertilizer composition; deriving organic fertilizer compositions from commercially available molasses; deriving thixotrophic fertilizer compositions from organic materials including molasses; and deriving organic fertilizer compositions from yeast/black strap molasses. However, these organic fertilizer compositions typically lack the requisite concentrations of nutrients to be beneficial to agricultural vegetation.

Some efforts to "boost" the concentrations of nutrients in these waste by-product based organic fertilizer compositions require significant chemical processing and/or the addition of synthetically derived chemicals. However, this approach often defeated the original goal of developing an "organic" fertilizer composition, and in many cases proved too costly to be economically feasible. In other cases, it was believed that certain by-products were not capable of satisfying the requirements of federal rules regulating organic fertilizers. Thus, some sources of fertilizer nutrients were dismissed as too expensive and/or as non-organic.

Betaine is an N-trimethylated amino acid historically used as a feed additive for many animal species. As a source of fertilizer nutrients, it is traditionally taught that betaine cannot satisfy the requirements necessary for use in USDA certified organic crop production and is also too expensive for conventional fertilizer use. In addition, betaine was historically thought to have too high a pH to be effectively and universally used as a fertilizer.

Given the cost of betaine and that betaine was not considered suitable for use in USDA certified organic crop production, traditional teaching was that it was more cost effective for a user seeking fertilizer to purchase urea, which is less expense and contains a higher percentage of nitrogen than betaine. Thus, traditional agriculture largely ignored betaine as a viable fertilizer.

There is a current need for an environmentally benign fertilizer derived from a natural organic source that provides sufficient levels of usable nutrients but does not require significant processing, does not raise environmental concerns, and does not adversely affect the pH of the soil.

SUMMARY

In accordance with one embodiment, a method for organic fertilization using betaine is disclosed. As discussed below, betaine is a by-product of the de-sugaring of beet molasses and is therefore typically readily available. Despite being readily available, traditional agricultural teaching was that betaine was not a viable organic fertilizer component because it was thought that betaine failed to meet the requirements necessary for use in USDA certified organic crop production and that betaine was too alkaline a substance for use as an all-purpose fertilizer.

The USDA, through its "National Organic Program" (NOP), regulates the certification, production, handling, and labeling of USDA organic products. It was traditionally taught that betaine could not satisfy the NOP regulations necessary to be used in the production of USDA certified organic crops. Furthermore, it was traditionally taught that betaine was not an economically viable fertilizer component because of its initial expense. In addition, betaine was largely considered too alkaline a substance for use with many types of soil. However, in contrast to traditional teachings, and as a result of extensive research and experimentation, the Inventor discovered the unexpected result that, properly processed, betaine can meet the USDA National Organic Program standards and therefore can be classified as an organic fertilizer and be readily and effectively used as an organic fertilizer.

In one embodiment, a quantity of betaine is obtained. In one embodiment, the betaine is filtered to remove suspended particulate matter. In one embodiment, filtration is provided using a wire mesh size in a range of 50 to 200.

In one embodiment, the betaine is not filtered.

In one embodiment, the betaine is heat-treated. In one embodiment, the heat treatment is performed in a range of about 130 to 200 degrees Fahrenheit (F) for between 4 hours to 15 days. In one embodiment, the betaine is aerated.

In one embodiment, the heat-treated betaine is cooled to yield a betaine based organic fertilizer product.

In one embodiment, the betaine is not heat-treated.

In one embodiment, the heat-treated betaine is filtered pre- and/or post-cooling. In one embodiment, filtration is provided using a wire mesh size in a range of 50 to 200.

In one embodiment, the heat-treated betaine is not filtered.

In one embodiment, a betaine based organic fertilizer product is created by applying/adding the obtained betaine directly to the agricultural vegetation and/or the fields/soil/substrate supporting the agricultural vegetation.

In one embodiment, a betaine based organic fertilizer product is created by adding the betaine directly to an irrigation system servicing the agricultural vegetation.

In one embodiment, a betaine based organic fertilizer product is created by applying/adding the obtained betaine directly to the agricultural vegetation and/or the field/soil/substrate supporting the agricultural vegetation in a concentration of less than 90% betaine.

In one embodiment, a betaine based organic fertilizer product is created by applying/adding the obtained betaine directly to the agricultural vegetation and/or the field/soil/substrate supporting the agricultural vegetation in a concentration of greater than 90% betaine.

In one embodiment, a betaine based organic fertilizer product is created by applying/adding the obtained betaine directly to the agricultural vegetation and/or the fields/soil/substrate supporting the agricultural vegetation in a concentration of 100% betaine.

In one embodiment, a betaine based organic fertilizer product is created by adding the betaine directly to an irrigation system servicing the agricultural vegetation.

In one embodiment, a betaine based organic fertilizer product is created by adding betaine in a concentration of less than 90% directly to an irrigation system servicing the agricultural vegetation.

In one embodiment, a betaine based organic fertilizer product is created by adding betaine in a concentration of greater than 90% directly to an irrigation system servicing the agricultural vegetation.

In one embodiment, a betaine based organic fertilizer product is created by adding 100% betaine directly to an irrigation system servicing the agricultural vegetation.

In one embodiment, a betaine based organic fertilizer product is created by combining betaine with a liquid base, such as water or any other liquid combination, to obtain a desired concentration of betaine. In one embodiment, the desired concentration of betaine is 20% to 60%. In other embodiments, the concentration of betaine is any desired percentage concentration.

In one embodiment, a betaine based organic fertilizer product is created by combining the obtained betaine with a semi-liquid base and/or combining the obtained betaine with one or more solids or semi-solids, and in one embodiment processing the combination to achieve a desired concentration of betaine. In one embodiment, the desired concentration of betaine is 20% to 60%.

In one embodiment, once created, the betaine based organic fertilizer product is then applied directly to the agricultural vegetation and/or the fields/soil/substrate supporting the agricultural vegetation.

In one embodiment, once created, the betaine based organic fertilizer product is then added to an irrigation system servicing the agricultural vegetation.

In one embodiment, once created, the betaine based organic fertilizer product is applied to pellets that can be applied/added directly to the agricultural vegetation and/or the fields/soil/substrate supporting the agricultural vegetation.

In one embodiment, the betaine based organic fertilizer product is applied to fields of agricultural vegetation in quantities in the approximate range of 5 to 400 gallons per acre.

While developing a betaine based organic fertilizer product, the inventor realized that betaine is too alkaline for use as a general fertilizer. Soils are either acidic, neutral, or alkaline and their pHs can be affected by various factors, including fertilizers. Without additional processing, a betaine based organic fertilizer product is generally only appropriate for use on acidic soils. Importantly, soil pH directly affects nutrient availability, thus directly affecting plant growth. Furthermore, plants have specific soil pH requirements. Therefore, optimal plant growth is dependent on an optimal pH. Some experts consider a slightly acidic soil to be ideal as a slightly acidic soil pH is thought to optimize micro- and macronutrient availability while minimizing the toxicity of availability of nutrients in the soil.

Because the inventor realized that betaine is a valuable nutrient source, the inventor sought to adjust the pH of a betaine based organic fertilizer product and discovered that by combining and processing betaine with various pH adjusting materials, the resulting pH adjusted betaine based organic fertilizer product can retain the benefits of betaine in a pH adjusted form.

In accordance with one embodiment, a pH adjusted betaine based organic fertilizer product is created by combining betaine, a by-product of the de-sugaring of beet molasses, and pH adjusting material to create a raw combination of betaine and pH adjusting material.

In one embodiment, the pH adjusting material includes, but is not limited to, citric acid, a weak organic acid with the formula $C_6H_8O_7$. Citric acid naturally occurs in various fruits and vegetables and can be produced using microorganisms. Thus, citric acid is readily available. After extensive research and experimentation, the inventor realized that by combining citric acid with betaine and, in various embodiments, processing the combination as disclosed herein, a pH adjusted betaine based organic fertilizer product can be produced. The inventor discovered that a combination of betaine and citric acid containing up to 3% citric acid adjusts the pH of the combination down to 5 on the pH scale. Surprisingly, combining citric acid with betaine in a percentage greater than 3% citric acid does not continue to affect the pH of the combination. When combined with betaine, citric acid does not alter the NPK value of the resulting pH adjusted betaine based organic fertilizer.

An NPK value refers to the relative content of the elements nitrogen (N), phosphorus (P), and potassium (K), which are commonly used in fertilizers as these elements provide nutrients to the soil. Desirable NPK values vary depending on the amount and ratio of nutrients necessary for a particular soil type and particular type of plant. In some instances, the NPK values must be carefully calibrated to avoid providing too much or not enough of any element.

Thus, in some cases, it is useful to alter a fertilizer's pH without altering its NPK value.

In one embodiment, the pH adjusting material includes, but is not limited to acetic acid, an organic acid with the formula $CH_3COOH$. When combined with betaine, acetic acid does not alter the NPK value of the resulting pH adjusted betaine based organic fertilizer. Generally, acetic acid is synthesized in a manner inappropriate for use in USDA certified organic crop production, but there is a nonsynthetic form of acetic acid that is acceptable under NOP standards. By combining acetic acid with betaine and, in various embodiments, processing the combination as disclosed herein, a pH adjusted betaine based organic fertilizer product can be produced. The inventor believes that by combining betaine and acetic acid, the pH of the combination can be adjusted down to as low as 5 on the pH scale.

In one embodiment, the pH adjusting material includes, but is not limited to, grain by-products. Grain by-products are acidic and, in one embodiment, include, but are not limited to, one or more of the following: corn steep liquor, wet distillers grains, dried distillers grains with solubles, fermented grain solubles, corn condensed distillers solubles, and/or any other grain by-products as defined herein, known in the art at the time of filing, or developed thereafter. As incidental products of grain processing, these grain by-products are readily available. For example, corn steep liquor is a by-product of corn wet-milling and is readily available from ethanol production facilities. When combined with betaine, grain by-products alter the NPK value of the resulting pH adjusted betaine based organic fertilizer as grain by-products are a nitrogen source.

As discussed above, an NPK value represents the relative content of the elements nitrogen, phosphorus, and potassium in a substance. In some instances, it is useful to alter an NPK value to change the ratio or amount of nutrients present in a fertilizer.

In one embodiment, the raw combination of betaine and pH adjusting material is heat-treated and, in one embodiment, optionally filtered to remove suspended particulate matter. In one embodiment, the heat-treated combination of betaine and pH adjusting material is cooled to yield the pH adjusted betaine based organic fertilizer product. In one embodiment, the pH adjusted betaine based organic fertilizer product is applied to agricultural vegetation, either directly or by inclusion in an irrigation stream.

In one embodiment, a quantity of betaine is obtained.

In one embodiment, pH adjusting material is obtained. pH adjusting material includes, but is not limited to, citric acid, acetic acid, and/or grain by-products, and/or any other pH adjusting material as known in the art at the time of filing and/or as developed after the time of filing. pH adjusting material is also typically readily available.

In one embodiment, the pH adjusting material is combined with the betaine such that the resulting raw combination of betaine and pH adjusting material is less than 5% pH adjusting material and greater than 95% betaine. In one embodiment, the pH adjusting material is combined with the betaine such that the resulting raw combination of betaine and pH adjusting material is 5% to 40% pH adjusting material and 60% to 95% betaine. In one embodiment, the pH adjusting material is combined with the betaine such that the resulting raw combination of betaine and pH adjusting material is 40% to 60% pH adjusting material and 60% to 40% betaine. In one embodiment, the pH adjusting material is combined with the betaine such that the resulting raw combination of betaine and pH adjusting material is 70% to 80% pH adjusting material and 30% to 20% betaine. In one embodiment, the pH adjusting material is combined with the betaine such that the resulting raw combination of betaine and pH adjusting material is greater than 80% pH adjusting material and less than 20% betaine. In other embodiments, the betaine is combined with the pH adjusting material such that the resulting raw combination of betaine and pH adjusting material is any desired percentage concentration of betaine and pH adjusting material.

In one embodiment, the raw betaine and pH adjusting material is filtered to remove suspended particulate matter. In one embodiment, filtration is provided using a wire mesh size in a range of 50 to 200.

In one embodiment, the raw betaine and pH adjusting material is not filtered.

In one embodiment, the raw combination of betaine and pH adjusting material is then heat-treated. In one embodiment, the heat treatment is performed in a range of about 130 to 200 degrees Fahrenheit (F) for between 4 hours to 15 days. In one embodiment, the raw combination of betaine and pH adjusting material is aerated.

In one embodiment, the heat-treated combination of betaine and pH adjusting material is cooled to yield the pH adjusted betaine based organic fertilizer product.

In one embodiment, the raw betaine and pH adjusting material is not heat-treated.

In one embodiment, the raw combination of betaine and pH adjusting material is not heat-treated.

In one embodiment, the heat-treated combination of betaine and pH adjusting material is filtered pre- and/or post-cooling. In one embodiment, filtration is provided using a wire mesh size in a range of 50 to 200.

In one embodiment, the heat-treated combination of betaine and pH adjusting material is not filtered.

In one embodiment, the pH adjusted betaine based organic fertilizer product is applied to fields of agricultural vegetation in quantities in the approximate range of 5 to 400 gallons per acre. In one embodiment, the pH adjusted betaine based organic fertilizer product disclosed herein is applied directly to the agricultural vegetation and/or the fields/soil/substrate supporting the agricultural vegetation. In one embodiment, the pH adjusted betaine based organic fertilizer product is applied to the agricultural vegetation and/or the fields/soil/substrate supporting the agricultural vegetation by inclusion in an irrigation stream. In one embodiment, the pH adjusted betaine based organic fertilizer product is directly sprayed onto the agricultural vegetation.

Using the process for production of a pH adjusted betaine based organic fertilizer product disclosed herein, a pH adjusted betaine based organic fertilizer product is provided that is environmentally benign; is non-pathogenic; is derived from a natural organic source; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

As discussed in more detail below, using the below embodiments, with little or no modification and/or user input, there is considerable flexibility, adaptability, and opportunity for customization to meet the specific needs of various users under numerous circumstances.

Figure 1:
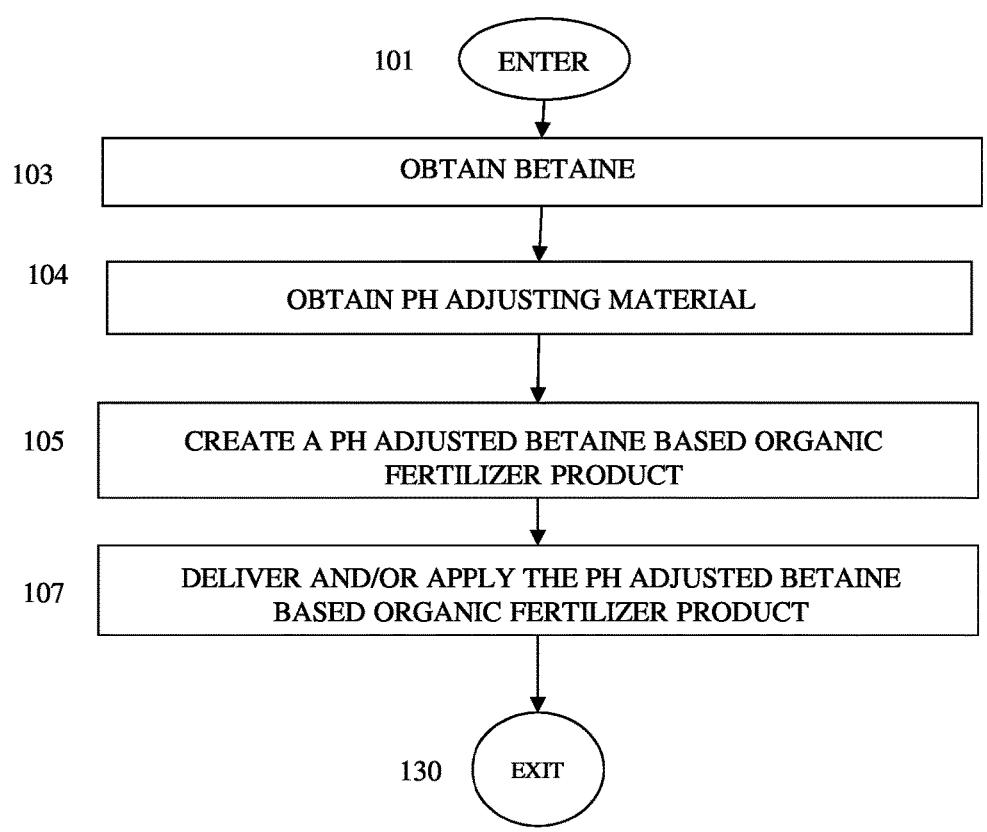
FIG. 1 is a flow chart of a method for organic fertilization using a pH adjusted betaine based organic fertilizer product in accordance with one embodiment.

Common reference numerals are used throughout the FIG.s and the detailed description to indicate like elements. One skilled in the art will readily recognize that the above FIG.s are examples and that other embodiments can be provided and implemented without departing from the characteristics and features of the invention, as set forth in the claims.

DETAILED DESCRIPTION

Embodiments will now be discussed with reference to the accompanying FIG.s, which depict exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

As used herein, the term "organic fertilizer" means an ingredient or product that may be used in certified organic crop production in accordance with USDA National Organic Program standards.

Currently, 7 CFR 205.203 provides the practice standard for certified organic crop production. The regulations under 7 CFR 205.203 provide the following:

(a) The producer must select and implement tillage and cultivation practices that maintain or improve the physical, chemical, and biological condition of soil and minimize soil erosion.

(b) The producer must manage crop nutrients and soil fertility through rotations, cover crops, and the application of plant and animal materials.

(c) The producer must manage plant and animal materials to maintain or improve soil organic matter content in a manner that does not contribute to contamination of crops, soil, or water by plant nutrients, pathogenic organisms, heavy metals, or residues of prohibited substances. Animal and plant materials include:

(1) Raw animal manure, which must be composted unless it is:

(i) Applied to land used for a crop not intended for human consumption;

(ii) Incorporated into the soil not less than 120 days prior to the harvest of a product whose edible portion has direct contact with the soil surface or soil particles; or (iii) Incorporated into the soil not less than 90 days prior to the harvest of a product whose edible portion does not have direct contact with the soil surface or soil particles;

(2) Composted plant and animal materials produced through a process that:

(i) Established an initial C:N ratio of between 25:1 and 40:1; and (ii) Maintained a temperature of between 131° F. and 170° F. for 3 days using an in-vessel or static aerated pile system; or (iii) Maintained a temperature of between 131° F. and 170° F. for 15 days using a windrow composting system, during which period, the materials must be turned a minimum of five times.

(3) Uncomposted plant materials.

(d) A producer may manage crop nutrients and soil fertility to maintain or improve soil organic matter content in a manner that does not contribute to contamination of crops, soil, or water by plant nutrients, pathogenic organisms, heavy metals, or residues of prohibited substances by applying:

(1) A crop nutrient or soil amendment included on the National List of synthetic substances allowed for use in organic crop production;

(2) A mined substance of low solubility;

(3) A mined substance of high solubility: Provided, That, the substance is used in compliance with the conditions established on the National List of nonsynthetic materials prohibited for crop production;

(4) Ash obtained from the burning of a plant or animal material, except as prohibited in paragraph (e) of this section: Provided, That, the material burned has not been treated or combined with a prohibited substance or the ash is not included on the National List of nonsynthetic substances prohibited for use in organic crop production; and (5) A plant or animal material that has been chemically altered by a manufacturing process: Provided, that, the material is included on the National List of synthetic substances allowed for use in organic crop production established in §205.601.

(e) The producer must not use:

(1) Any fertilizer or composted plant and animal material that contains a synthetic substance not included on the National List of synthetic substances allowed for use in organic crop production;

(2) Sewage sludge (biosolids) as defined in 40 CFR part 503; and (3) Burning as a means of disposal for crop residues produced on the operation: Except, That, burning may be used to suppress the spread of disease or to stimulate seed germination.

As used herein, the term "pH adjusting material" includes liquid pH adjusting material, and/or any solid and/or semi-solid pH adjusting material, and/or any liquid, semi-solid, or solid pH adjusting material that adjusts the pH of raw betaine, as discussed herein, and/or as known in the art at the time of filing, and/or as developed after the time of filing. In various embodiments, the term "pH adjusting material" includes, but is not limited to, citric acid, acetic acid, and/or grain by-products, and/or any other pH adjusting material as known in the art at the time of filing and/or as developed after the time of filing.

As used herein, the term "combination" includes, but is not limited to, a mixture, solution, colloid, and/or suspension.

In accordance with one embodiment, a method for organic fertilization using betaine includes creating a pH adjusted betaine based organic fertilizer product and applying the pH adjusted betaine based organic fertilizer product to agricultural vegetation and/or the fields/soil/substrate supporting the agricultural vegetation as a method of organic fertilization of the agricultural vegetation.

FIG. 1 shows a flow chart of a method for organic fertilization using a pH adjusted betaine based organic fertilizer product 100 in accordance with one embodiment. As shown in FIG. 1, the method for organic fertilization of agricultural vegetation using betaine 100 begins at enter operation 101 and process flow proceeds to OBTAIN BETAINE OPERATION 103.

In one embodiment, at OBTAIN BETAINE OPERATION 103 a quantity of betaine is obtained.

Betaine, along with concentrated molasses solids, is produced as a by-product of de-sugaring beet molasses by chromatographic extraction techniques. In the chromatographic extraction desugaring process, considerable amounts of high-purity betaine are recovered and are readily available. Traditionally, this betaine was used as a liquid animal feed supplement.

A discussion of the improved chromatographic separation process currently practiced by many sugar refiners is provided in "Raw Juice Chromatographic Separation Process" published in the Proceedings from the 28th Biennial ASSBT Meeting, Operations, New Orleans, La., March 8-11, 1995, by Kearney, Kochergin, Petersen, Velasquez and Jacob of Amalgamated Research Inc.

As also noted above, despite being readily available, betaine was not considered an economically viable fertilizer component by traditional agricultural teachings because of its initial expense, its relatively small percentage of available nitrogen, and the belief that betaine could not satisfy NOP regulations to be used in certified organic crop production.

According to this long-standing teaching in the art, the use of betaine as a fertilizer was prohibitively expensive and it was considered more cost effective for a user seeking fertilizer to purchase urea, which contains a higher percentage of nitrogen than betaine, than to purchase betaine. Consequently, given the expense of betaine and its relatively small percentage of nitrogen, traditional agriculture largely ignored betaine as a viable fertilizer. However, as a result of extensive research and experimentation, the inventor discovered the unexpected result that properly processed, betaine can meet the USDA National Organic Program standards set forth above, and can therefore be used as an organic fertilizer in certified organic crop production. Once the inventor realized that betaine can be processed in such a way that it can be used in crop production that meets the USDA National Organic Program standards, the inventor realized that betaine has a special use and special value as an organic nitrogen source and that this discovered property more than justifies its expense.

In one embodiment, once a quantity of betaine is obtained at OBTAIN BETAINE OPERATION 103, process flow proceeds to OBTAIN PH ADJUSTING MATERIAL OPERATION 104.

In various embodiments, pH adjusting material includes, but is not limited to, citric acid, acetic acid, grain by-products, corn steep liquor, wet distillers grains, dried distillers grains with solubles, fermented grain solubles, corn condensed distillers solubles, and/or any other pH adjusting material as known in the art at the time of filing and/or as developed after the time of filing.

In one embodiment, once a quantity of pH adjusting material is obtained at OBTAIN PH ADJUSTING MATERIAL OPERATION 104, process flow proceeds to CREATE A PH ADJUSTED BETAINE BASED ORGANIC FERTILIZER PRODUCT OPERATION 105.

In one embodiment, at CREATE A PH ADJUSTED BETAINE BASED ORGANIC FERTILIZER PRODUCT OPERATION 105, a pH adjusted betaine based organic fertilizer product is created.

In one embodiment, at CREATE A PH ADJUSTED BETAINE BASED ORGANIC FERTILIZER PRODUCT OPERATION 105 a pH adjusted betaine based organic fertilizer product is created by combining the obtained betaine of OBTAIN BETAINE OPERATION 103 with the obtained pH adjusting material of OBTAIN PH ADJUSTING MATERIAL OPERATION 104.

In one embodiment, at CREATE A PH ADJUSTED BETAINE BASED ORGANIC FERTILIZER PRODUCT OPERATION 105, a pH adjusted betaine based organic fertilizer product is created by applying/adding the obtained betaine of OBTAIN BETAINE OPERATION 103 and the obtained pH adjusting material of OBTAIN PH ADJUSTING MATERIAL OPERATION 104 directly to the agricultural vegetation and/or the fields/soil/substrate supporting the agricultural vegetation.

In one embodiment, a pH adjusted betaine based organic fertilizer product is created at CREATE A PH ADJUSTED BETAINE BASED ORGANIC FERTILIZER PRODUCT OPERATION 105 by applying/adding the obtained betaine of OBTAIN BETAINE OPERATION 103 and the obtained pH adjusting material of OBTAIN PH ADJUSTING MATERIAL OPERATION 104 directly to the agricultural vegetation and/or the fields/soil/substrate supporting the agricultural vegetation in a concentration of less than 90% betaine.

In one embodiment, a pH adjusted betaine based organic fertilizer product is created at CREATE A PH ADJUSTED BETAINE BASED ORGANIC FERTILIZER PRODUCT OPERATION 105 by applying/adding the obtained betaine of OBTAIN BETAINE OPERATION 103 and the obtained pH adjusting material of OBTAIN PH ADJUSTING MATERIAL OPERATION 104 directly to the agricultural vegetation and/or the fields/soil/substrate supporting the agricultural vegetation in a concentration of equal to or greater than 90% betaine.

In one embodiment, a pH adjusted betaine based organic fertilizer product is created at CREATE A PH ADJUSTED BETAINE BASED ORGANIC FERTILIZER PRODUCT OPERATION 105 by applying/adding the obtained betaine of OBTAIN BETAINE OPERATION 103 and the obtained pH adjusting material of OBTAIN PH ADJUSTING MATERIAL OPERATION 104 directly to the agricultural vegetation and/or the fields/soil/substrate supporting the agricultural vegetation in a concentration of 100% betaine.

In one embodiment, at CREATE A PH ADJUSTED BETAINE BASED ORGANIC FERTILIZER PRODUCT OPERATION 105, a pH adjusted betaine based organic fertilizer product is created by adding the obtained betaine of OBTAIN BETAINE OPERATION 103 and the obtained pH adjusting material of OBTAIN PH ADJUSTING MATERIAL OPERATION 104 directly to an irrigation system servicing the agricultural vegetation.

In one embodiment, a pH adjusted betaine based organic fertilizer product is created at CREATE A PH ADJUSTED BETAINE BASED ORGANIC FERTILIZER PRODUCT OPERATION 105 by adding the obtained betaine of OBTAIN BETAINE OPERATION 103 and the obtained pH adjusting material of OBTAIN PH ADJUSTING MATERIAL OPERATION 104 in a concentration of less than 90% directly to an irrigation system servicing the agricultural vegetation.

In one embodiment, a pH adjusted betaine based organic fertilizer product is created at CREATE A PH ADJUSTED BETAINE BASED ORGANIC FERTILIZER PRODUCT OPERATION 105 by adding the obtained betaine of OBTAIN BETAINE OPERATION 103 and the obtained pH adjusting material of OBTAIN PH ADJUSTING MATERIAL OPERATION 104 in a concentration of greater than 90% directly to an irrigation system servicing the agricultural vegetation.

In one embodiment, at CREATE A PH ADJUSTED BETAINE BASED ORGANIC FERTILIZER PRODUCT OPERATION 105, a pH adjusted betaine based organic fertilizer product is created by the obtained betaine of OBTAIN BETAINE OPERATION 103 and the obtained pH adjusting material of OBTAIN PH ADJUSTING MATERIAL OPERATION 104 with a liquid base, such as water or any other liquid or combination, to obtain a desired concentration of betaine. In one embodiment, the desired concentration of betaine is 20% to 60%.

In one embodiment, at CREATE A PH ADJUSTED BETAINE BASED ORGANIC FERTILIZER PRODUCT OPERATION 105 a pH adjusted betaine based organic fertilizer product is created by combining the obtained betaine of OBTAIN BETAINE OPERATION 103 and the obtained pH adjusting material of OBTAIN PH ADJUSTING MATERIAL OPERATION 104 with a semi-liquid base and/or combining the obtained betaine with one or more solids or semi-solids to achieve a desired concentration of betaine. In one embodiment, the desired concentration of betaine is 20% to 60%.

In one embodiment, at CREATE A PH ADJUSTED BETAINE BASED ORGANIC FERTILIZER PRODUCT OPERATION 105 a pH adjusted betaine based organic fertilizer product is created by applying the obtained betaine of OBTAIN BETAINE OPERATION 103 and the obtained pH adjusting material of OBTAIN PH ADJUSTING MATERIAL OPERATION 104 to pellets that can be applied/added directly to the agricultural vegetation and/or the fields/soil/substrate supporting the agricultural vegetation.

In one embodiment, once a pH adjusted betaine based organic fertilizer product is created at CREATE A PH ADJUSTED BETAINE BASED ORGANIC FERTILIZER PRODUCT OPERATION 105, process flow proceeds to DELIVER AND/OR APPLY THE PH ADJUSTED BETAINE BASED ORGANIC FERTILIZER PRODUCT OPERATION 107.

In one embodiment, at DELIVER AND/OR APPLY THE PH ADJUSTED BETAINE BASED ORGANIC FERTILIZER PRODUCT OPERATION 107, the pH adjusted betaine based organic fertilizer product of CREATE A PH ADJUSTED BETAINE BASED ORGANIC FERTILIZER PRODUCT OPERATION 105 is transferred in bulk to a tanker truck and/or transferred into drums for delivery of smaller quantities of the pH adjusted betaine based organic fertilizer product. In one embodiment, at DELIVER AND/OR APPLY THE PH ADJUSTED BETAINE BASED ORGANIC FERTILIZER PRODUCT OPERATION 107, the pH adjusted betaine based organic fertilizer product of CREATE A PH ADJUSTED BETAINE BASED ORGANIC FERTILIZER PRODUCT OPERATION 105 is then delivered to farms for application to agricultural vegetation.

In one embodiment, at DELIVER AND/OR APPLY THE PH ADJUSTED BETAINE BASED ORGANIC FERTILIZER PRODUCT OPERATION 107, a quantity of the pH adjusted betaine based organic fertilizer product of CREATE A PH ADJUSTED BETAINE BASED ORGANIC FERTILIZER PRODUCT OPERATION 105 is offloaded into plastic field tanks located at or near the application site. In one embodiment, at DELIVER AND/OR APPLY THE PH ADJUSTED BETAINE BASED ORGANIC FERTILIZER PRODUCT OPERATION 107, the plastic field tanks are then used to feed the pH adjusted betaine based organic fertilizer product of CREATE A PH ADJUSTED BETAINE BASED ORGANIC FERTILIZER PRODUCT OPERATION 105 into an irrigation stream either by direct injection or by vacuum drawing from the irrigation flow.

Depending on the particular agricultural vegetation requirements, the application rate of the pH adjusted betaine based organic fertilizer product of CREATE A PH ADJUSTED BETAINE BASED ORGANIC FERTILIZER PRODUCT OPERATION 105 at DELIVER AND/OR APPLY THE PH ADJUSTED BETAINE BASED ORGANIC FERTILIZER PRODUCT OPERATION 107 may be anywhere in a range of approximately 5 to 400 gallons per acre.

In one embodiment, at DELIVER AND/OR APPLY THE PH ADJUSTED BETAINE BASED ORGANIC FERTILIZER PRODUCT OPERATION 107, the pH adjusted betaine based organic fertilizer product of CREATE A PH ADJUSTED BETAINE BASED ORGANIC FERTILIZER PRODUCT OPERATION 105 is applied to pellets that can be applied/added directly to the agricultural vegetation and/or the fields/soil/substrate supporting the agricultural vegetation.

In one embodiment, at DELIVER AND/OR APPLY THE PH ADJUSTED BETAINE BASED ORGANIC FERTILIZER PRODUCT OPERATION 107, the pH adjusted betaine based organic fertilizer product of CREATE A PH ADJUSTED BETAINE BASED ORGANIC FERTILIZER PRODUCT OPERATION 105 may also be directly sprayed onto the agricultural vegetation without concerns of plant burning, which may occur with more concentrated inorganic fertilizers.

In one embodiment, once the pH adjusted betaine based organic fertilizer product of CREATE A PH ADJUSTED BETAINE BASED ORGANIC FERTILIZER PRODUCT OPERATION 105 is delivered and applied at DELIVER AND/OR APPLY THE PH ADJUSTED BETAINE BASED ORGANIC FERTILIZER PRODUCT OPERATION 107, process flow proceeds to EXIT OPERATION 130 and process for organic fertilization of agricultural vegetation using betaine 100 is exited.

Using the method for organic fertilization of agricultural vegetation using betaine 100, contrary to conventional teachings, a pH adjusted betaine based organic fertilizer product is provided that is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components that become bioavailable to agricultural vegetation by beneficial microbial digestion in soil; and eliminates chemical crop burning.

Consequently, using the process for organic fertilization of agricultural vegetation using betaine 100, the previously undiscovered use of betaine as a fertilizer nutrient for use in USDA certified organic crop production is disclosed, thereby providing a new use for betaine in contrast to prior art teachings and providing a solution to the long standing problem of finding new sources of organic fertilizer nutrients and new methods of organic fertilization.

Figure 2:
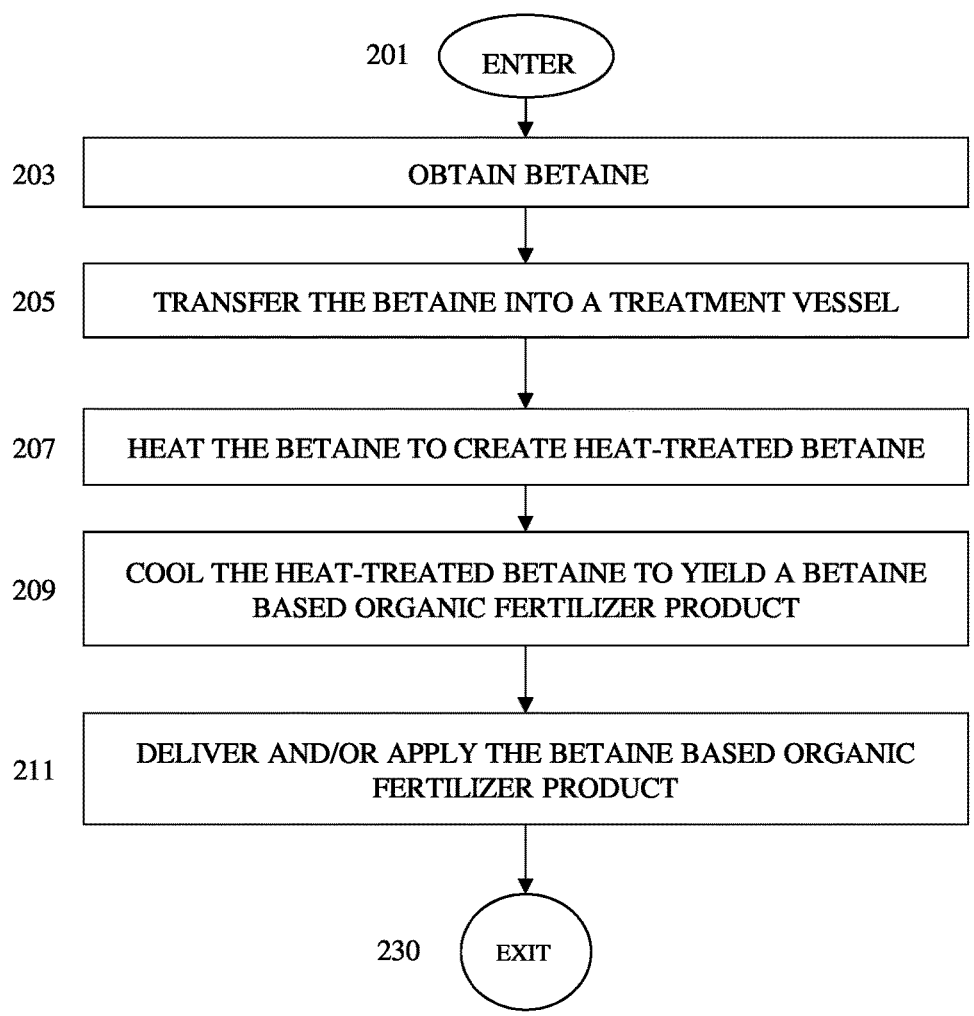
FIG. 2 is a flow chart of a process for creating betaine based organic fertilizer product in accordance with one embodiment.

FIG. 2 is a flow chart of a process for production of a betaine based organic fertilizer product 200 in accordance with one embodiment. As shown in FIG. 2, process for production of a betaine based organic fertilizer product 200 begins at enter operation 201 and process flow proceeds to OBTAIN BETAINE OPERATION 203.

In one embodiment, at OBTAIN BETAINE OPERATION 203 a quantity of betaine is obtained.

Conventionally, the use of betaine as a fertilizer is very expensive. Thus, traditional teaching was that it was more cost effective for a user seeking fertilizer to purchase urea, which contains a higher percentage of nitrogen than betaine, than to purchase betaine. Given the expense of betaine and its relatively small percentage of nitrogen, traditional agriculture largely ignored betaine as a viable fertilizer. However, as a result of extensive research and experimentation, the inventor discovered the unexpected result that properly processed, betaine can meet the USDA National Organic Program standards and therefore can be used as an organic fertilizer.

Once the inventor identified the processing that allows betaine to meet the USDA National Organic Program standards for an organic fertilizer, the inventor realized that betaine has a special use and special value as an organic nitrogen source that more than justifies its expense.

Returning to FIG. 2, once a quantity of betaine is obtained at OBTAIN BETAINE OPERATION 203, process flow proceeds to TRANSFER THE BETAINE INTO A TREATMENT VESSEL OPERATION 205.

In one embodiment, at TRANSFER THE BETAINE INTO A TREATMENT VESSEL OPERATION 205, the betaine of OBTAIN BETAINE OPERATION 203 is transferred to a treatment vessel.

In one embodiment, at TRANSFER THE BETAINE INTO A TREATMENT VESSEL OPERATION 205, the betaine is filtered as it is transferred to the treatment vessel. In one embodiment, this filtering is optional, if, for example, the amount of suspended particulate matter has been found to be minimal. If pre-treatment filtration is desired, a stainless steel, or other suitable material, mesh having a mesh size number between 50 and 200 may be used. In one embodiment, the mesh size is 200.

In one embodiment, the treatment vessel of TRANSFER THE BETAINE INTO A TREATMENT VESSEL OPERATION 205 is an insulated stainless steel tank having electrically powered heat strips applied thereto. However, the tank construction and heating mechanism are not critical to the treatment process. For example, in one embodiment, at TRANSFER THE BETAINE INTO A TREATMENT VESSEL OPERATION 205, the treatment vessel is a carbon steel tank that is heated by steam supplied by a package boiler or cogeneration facility. One skilled in the art will appreciate that other non-metallic treatment vessels may be employed as well at TRANSFER THE BETAINE INTO A TREATMENT VESSEL OPERATION 205.

In one embodiment, once the betaine is transferred to a treatment vessel at TRANSFER THE BETAINE INTO A TREATMENT VESSEL OPERATION 205, process flow proceeds to HEAT THE BETAINE TO CREATE HEAT-TREATED BETAINE OPERATION 207.

In one embodiment, at HEAT THE BETAINE TO CREATE HEAT-TREATED BETAINE OPERATION 207, the betaine of OBTAIN BETAINE OPERATION 203 is mechanically heated.

In one embodiment, at HEAT THE BETAINE TO CREATE HEAT-TREATED BETAINE OPERATION 207, heat is applied to the betaine to raise the average temperature of the betaine to at least 130 degrees F.

In one embodiment, at HEAT THE BETAINE TO CREATE HEAT-TREATED BETAINE OPERATION 207, heat is added until the average temperature of the betaine is raised to approximately 130 degrees F. or more. This temperature range is known to inhibit pathogenic bacterial growth of the most common pathogens such as *Escherichia coli* O157:H7 and *Salmonella*.

In one embodiment, at HEAT THE BETAINE TO CREATE HEAT-TREATED BETAINE OPERATION 207 the betaine is maintained in the treatment vessel at or above 130 degrees F. for at least 24 hours to ensure uniform heat transfer to the betaine. In one embodiment, to aid in uniform heat transfer, an agitator or pumped recirculation flow may be employed at HEAT THE BETAINE TO CREATE HEAT-TREATED BETAINE OPERATION 207 as part of the treatment process. In one embodiment, if an agitator or pumped recirculation flow is used to maintain the uniform heat treatment, filtration may also be accomplished concurrently at HEAT THE BETAINE TO CREATE HEAT-TREATED BETAINE OPERATION 207 by placement of a suitable filter screen as discussed above, into the recirculation flow path. In one embodiment, the heat treatment of HEAT THE BETAINE TO CREATE HEAT-TREATED BETAINE OPERATION 207 may be performed for 120 hours or more, if desired. However, for energy conservation reasons, 24 to 48 hours of heat treatment is believed adequate.

In one embodiment, water may be blended with the heat-treated betaine at HEAT THE BETAINE TO CREATE HEAT-TREATED BETAINE OPERATION 207 to meet the desired nitrogen per weight or volume requirements of the betaine. In one embodiment, water may also be used to recover losses due to evaporation during the heat treatment process of HEAT THE BETAINE TO CREATE HEAT-TREATED BETAINE OPERATION 207. Water blending is typically not required, but is an optional procedure.

In one embodiment, once the betaine of OBTAIN BETAINE OPERATION 203 is heat-treated in the treatment vessel of TRANSFER THE BETAINE INTO A TREATMENT VESSEL OPERATION 205 at HEAT THE BETAINE TO CREATE HEAT-TREATED BETAINE OPERATION 207 to create heat-treated betaine, process flow proceeds to COOL THE HEAT-TREATED BETAINE TO YIELD A BETAINE BASED ORGANIC FERTILIZER PRODUCT OPERATION 209.

In one embodiment, at COOL THE HEAT-TREATED BETAINE TO YIELD A BETAINE BASED ORGANIC FERTILIZER PRODUCT OPERATION 209, the heat-treated betaine of HEAT THE BETAINE TO CREATE HEAT-TREATED BETAINE OPERATION 207 is allowed to cool in the treatment vessel of TRANSFER THE BETAINE INTO A TREATMENT VESSEL OPERATION 205.

As noted, in one embodiment, the cooling at COOL THE HEAT-TREATED BETAINE TO YIELD A BETAINE BASED ORGANIC FERTILIZER PRODUCT OPERATION 209 yields the resulting betaine based organic fertilizer product.

In one embodiment, once the heat-treated betaine is cooled at COOL THE HEAT-TREATED BETAINE TO YIELD A BETAINE BASED ORGANIC FERTILIZER PRODUCT OPERATION 209 to yield the betaine based organic fertilizer product, process flow proceeds to DELIVER AND/OR APPLY THE BETAINE BASED ORGANIC FERTILIZER PRODUCT OPERATION 211.

In one embodiment, at DELIVER AND/OR APPLY THE BETAINE BASED ORGANIC FERTILIZER PRODUCT OPERATION 211 the pH adjusted betaine based organic fertilizer product is transferred in bulk to a tanker truck and/or transferred into drums for delivery of smaller quantities of the betaine based organic fertilizer product. In one embodiment, at DELIVER AND/OR APPLY THE BETAINE BASED ORGANIC FERTILIZER PRODUCT OPERATION 211, the betaine based organic fertilizer product is delivered to farms for application to agricultural vegetation.

In one embodiment, at DELIVER AND/OR APPLY THE BETAINE BASED ORGANIC FERTILIZER PRODUCT OPERATION 211, a quantity of the betaine based organic fertilizer product is offloaded into plastic field tanks located at or near the application site. In one embodiment, at DELIVER AND/OR APPLY THE BETAINE BASED ORGANIC FERTILIZER PRODUCT OPERATION 211, the plastic field tanks are then used to feed the betaine based organic fertilizer product into the irrigation stream either by direct injection or by vacuum drawing from the irrigation flow.

Depending on the particular agricultural vegetation requirements, the application rate of the betaine based organic fertilizer product at DELIVER AND/OR APPLY THE BETAINE BASED ORGANIC FERTILIZER PRODUCT OPERATION 211 may be anywhere in a range of approximately 5 to 400 gallons per acre.

In one embodiment, at DELIVER AND/OR APPLY THE BETAINE BASED ORGANIC FERTILIZER PRODUCT OPERATION 211, the betaine based organic fertilizer product may be directly sprayed onto the agricultural vegetation without concerns of plant burning as may occur with more concentrated inorganic fertilizers.

In one embodiment, once the betaine based organic fertilizer product is delivered and applied at DELIVER AND/OR APPLY THE BETAINE BASED ORGANIC FERTILIZER PRODUCT OPERATION 211, process flow proceeds to EXIT OPERATION 230 and process for creating a betaine based organic fertilizer product 200 is exited.

Using process for production of a betaine based organic fertilizer product 200, a betaine based organic fertilizer product is provided that is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

Figure 3:
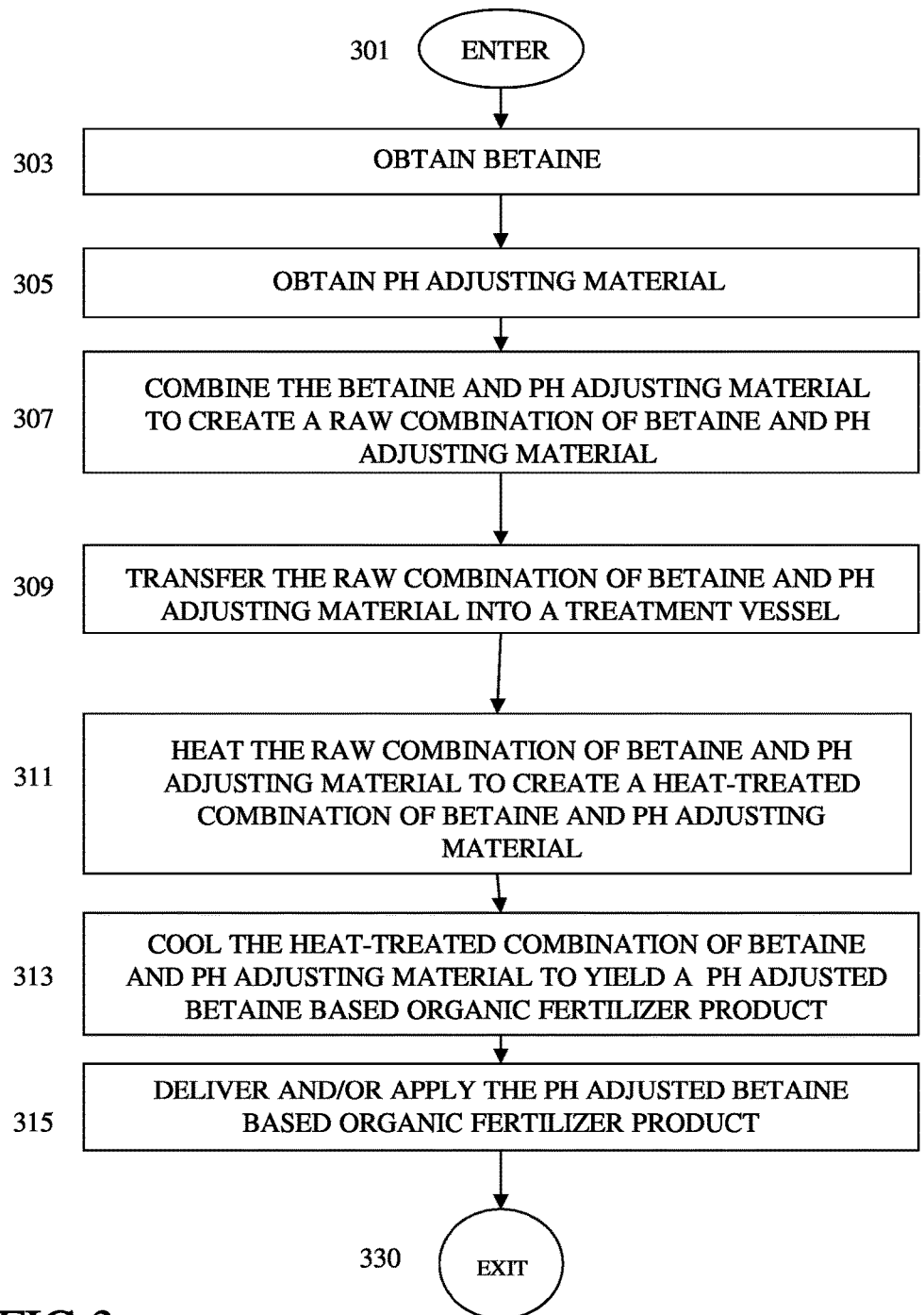
FIG. 3 is a flow chart of a process for creating a pH adjusted betaine based organic fertilizer product in accordance with one embodiment.

FIG. 3 is a flow chart of a process for production of a pH adjusted betaine based organic fertilizer product 300 in accordance with one embodiment.

In accordance with one embodiment, a process for production of a pH adjusted betaine based organic fertilizer product includes combining betaine, a by-product of the de-sugaring of beet molasses, and pH adjusting material. In various embodiments, pH adjusting material includes, but is not limited to, citric acid, acetic acid, grain by-products, corn steep liquor, wet distillers grains, dried distillers grains with solubles, fermented grain solubles, corn condensed distillers solubles, and/or any other pH adjusting material as known in the art at the time of filing and/or as developed after the time of filing. In one embodiment, the raw combination of betaine and pH adjusting material is heat-treated and, in one embodiment, optionally filtered to remove suspended particulate matter. In one embodiment, the heat-treated combination of betaine and pH adjusting material is cooled to yield the pH adjusted betaine based organic fertilizer product. In one embodiment, the pH adjusted betaine based organic fertilizer product is then applied to agricultural vegetation, either directly or by inclusion in an irrigation stream.

As shown in FIG. 3, process for production of a pH adjusted betaine based organic fertilizer product 300 begins at enter operation 301 and process flow proceeds to OBTAIN BETAINE OPERATION 303.

In one embodiment, at OBTAIN BETAINE OPERATION 303, a quantity of betaine is obtained.

Betaine is an N-trimethylated amino acid, and, historically, has been commonly used as a feed additive for many animal species.

When beet molasses is de-sugared by chromatographic extraction techniques, two by-products are produced: concentrated molasses solids and betaine. Thus, betaine is a by-product of the de-sugaring of beet molasses and therefore is readily available. In the chromatic extraction desugaring process, considerable amounts of high-purity betaine are recovered and used as liquid animal feed supplements.

Ultimately, the present Inventor discovered that the combination of betaine and pH adjusting material improves the efficacy of each component substance beyond what would be expected as traditionally taught by those of skill in the art. In essence, the resulting whole is greater than the sum of its parts. This efficacy results in both processed and non-processed combinations of betaine, and betaine and pH adjusting material.

Returning to FIG. 3, once a quantity of betaine is obtained at OBTAIN BETAINE OPERATION 303, process flow proceeds to OBTAIN PH ADJUSTING MATERIAL OPERATION 305.

In one embodiment, at OBTAIN PH ADJUSTING MATERIAL OPERATION 305, pH adjusting material is obtained.

As noted above, in various embodiments, pH adjusting material includes, but is not limited to, citric acid, acetic acid, grain by-products, corn steep liquor, wet distillers grains, dried distillers grains with solubles, fermented grain solubles, corn condensed distillers solubles, and/or any other pH adjusting material as known in the art at the time of filing and/or as developed after the time of filing. pH adjusting material is generally readily available.

In one embodiment, once pH adjusting material is obtained at OBTAIN PH ADJUSTING MATERIAL OPERATION 305, process flow proceeds to COMBINE THE BETAINE AND PH ADJUSTING MATERIAL TO CREATE A RAW COMBINATION OF BETAINE AND PH ADJUSTING MATERIAL OPERATION 307.

In one embodiment, at COMBINE THE BETAINE AND PH ADJUSTING MATERIAL TO CREATE A RAW COMBINATION OF BETAINE AND PH ADJUSTING MATERIAL OPERATION 307, the pH adjusting material is combined with the betaine.

In various embodiments, at COMBINE THE BETAINE AND PH ADJUSTING MATERIAL TO CREATE A RAW COMBINATION OF BETAINE AND PH ADJUSTING MATERIAL OPERATION 307, the pH adjusting material is combined with the betaine such that the resulting raw combination of betaine and pH adjusting material is any desired percentage concentration of pH adjusting material, typically as determined by cost and the specific needs of the user.

In one embodiment, the pH adjusting material is combined with the betaine such that the resulting raw combination of betaine and pH adjusting material is less than 5% pH adjusting material and greater than 95% betaine. In one embodiment, the pH adjusting material is combined with the betaine such that the resulting raw combination of betaine and pH adjusting material is 5% to 40% pH adjusting material and 60% to 95% betaine. In one embodiment, the pH adjusting material is combined with the betaine such that the resulting raw combination of betaine and pH adjusting material is 40% to 60% pH adjusting material and 60% to 40% betaine. In one embodiment, the pH adjusting material is combined with the betaine such that the resulting raw combination of betaine and pH adjusting material is 70% to 80% pH adjusting material and 30% to 20% betaine. In one embodiment, the pH adjusting material is combined with the betaine such that the resulting raw combination of betaine and pH adjusting material is greater than 80% pH adjusting material and less than 20% betaine. In other embodiments, the betaine is combined with the pH adjusting material such that the resulting raw combination of betaine and pH adjusting material is any desired percentage concentration of betaine and pH adjusting material.

In one embodiment, once the pH adjusting material is combined with the betaine at COMBINE THE BETAINE AND PH ADJUSTING MATERIAL TO CREATE A RAW COMBINATION OF BETAINE AND PH ADJUSTING MATERIAL OPERATION 307 to create a raw combination of betaine and pH adjusting material, process flow proceeds to TRANSFER THE RAW COMBINATION OF BETAINE AND PH ADJUSTING MATERIAL INTO A TREATMENT VESSEL OPERATION 309.

In one embodiment, at TRANSFER THE RAW COMBINATION OF BETAINE AND PH ADJUSTING MATERIAL INTO A TREATMENT VESSEL OPERATION 309, the raw combination of betaine and pH adjusting material of COMBINE THE BETAINE AND PH ADJUSTING MATERIAL TO CREATE A RAW COMBINATION OF BETAINE AND PH ADJUSTING MATERIAL OPERATION 307 is transferred to a treatment vessel.

In one embodiment, at TRANSFER THE RAW COMBINATION OF BETAINE AND PH ADJUSTING MATERIAL INTO A TREATMENT VESSEL OPERATION 309, the raw combination of betaine and pH adjusting material is filtered as the raw combination of betaine and pH adjusting material is transferred into the treatment vessel. In one embodiment, this filtering is optional, if, for example, the amount of suspended particulate matter has been found to be minimal. If pre-treatment filtration is desired, a stainless steel, or other suitable material, mesh having a mesh size number between 50 and 200 may be employed. In one embodiment, the mesh size is 200.

In one embodiment, the treatment vessel of TRANSFER THE RAW COMBINATION OF BETAINE AND PH ADJUSTING MATERIAL INTO A TREATMENT VESSEL OPERATION 309 is an insulated stainless steel tank having electrically powered heat strips applied thereto. However, the tank construction and heating mechanism are not critical to the treatment process. For example, in one embodiment, at TRANSFER THE RAW COMBINATION OF BETAINE AND PH ADJUSTING MATERIAL INTO A TREATMENT VESSEL OPERATION 309 the treatment vessel is a carbon steel tank which is heated by steam supplied by a package boiler or cogeneration facility. Moreover, the slightly basic pH of the combination of betaine with various pH adjusting materials is not considered particularly corrosive to the metals commonly used in the construction of metal treatment vessels. One skilled in the art will appreciate that other non-metallic treatment vessels may be employed as well at TRANSFER THE RAW COMBINATION OF BETAINE AND PH ADJUSTING MATERIAL INTO A TREATMENT VESSEL OPERATION 309.

In one embodiment, once the raw combination of betaine and pH adjusting material is transferred to a treatment vessel at TRANSFER THE RAW COMBINATION OF BETAINE AND PH ADJUSTING MATERIAL INTO A TREATMENT VESSEL OPERATION 309, process flow proceeds to HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311.

In one embodiment, at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311, the raw combination of betaine and pH adjusting material of COMBINE THE BETAINE AND PH ADJUSTING MATERIAL TO CREATE A RAW COMBINATION OF BETAINE AND PH ADJUSTING MATERIAL OPERATION 307 is mechanically heated.

In one embodiment, at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311, heat is applied to the raw combination of betaine and pH adjusting material to raise the average temperature of the raw combination of betaine and pH adjusting material to at least 130 degrees F.

In one embodiment, at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311, heat is added until the average temperature of the raw combination of betaine and pH adjusting material is raised to approximately 130 degrees F. or more. This temperature range is known to inhibit pathogenic bacterial growth of the most common pathogens such as *Escherichia coli* O157:H7 and *Salmonella*.

In one embodiment, at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311, the combination of betaine and pH adjusting material is maintained in the treatment vessel at or above 130 degrees F. for at least 24 hours to ensure uniform heat transfer to the combination of betaine and pH adjusting material. In one embodiment, to aid in uniform heat transfer, an agitator or pumped recirculation flow may be employed at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311 as part of the treatment process. In one embodiment, if an agitator or pumped recirculation flow is used to maintain the uniform heat treatment, filtration may also be accomplished concurrently at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311 by placement of a suitable filter screen as discussed above, into the recirculation flow path. In one embodiment, the heat treatment of HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311 may be performed for 120 hours or more, if desired. However, for energy conservation reasons 24 to 48 hours of heat treatment is believed to be adequate.

In one embodiment, water may be blended with the heat-treated combination of betaine and pH adjusting material at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311 to meet the desired nitrogen per weight or volume requirements of the combination of betaine and pH adjusting material. In one embodiment, water may also be used to recover losses due to evaporation during the heat treatment process of HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311. However, water blending is typically not required, but is rather an optional procedure.

In one embodiment, once the raw combination of betaine and pH adjusting material of COMBINE THE BETAINE AND PH ADJUSTING MATERIAL TO CREATE A RAW COMBINATION OF BETAINE AND PH ADJUSTING MATERIAL OPERATION 307 is heat-treated in the treatment vessel of TRANSFER THE RAW COMBINATION OF BETAINE AND PH ADJUSTING MATERIAL INTO A TREATMENT VESSEL OPERATION 309 at HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311 to create a heat-treated combination of betaine and pH adjusting material, process flow proceeds to COOL THE HEAT-TREATED COMBINATION OF BETAINE AND PH ADJUSTING MATERIAL TO YIELD A PH ADJUSTED BETAINE BASED ORGANIC FERTILIZER PRODUCT OPERATION 313.

In one embodiment, at COOL THE HEAT-TREATED COMBINATION OF BETAINE AND PH ADJUSTING MATERIAL TO YIELD A PH ADJUSTED BETAINE BASED ORGANIC FERTILIZER PRODUCT OPERATION 313, the heat-treated combination of betaine and pH adjusting material of HEAT THE RAW COMBINATION OF BETAINE AND PH ADJUSTING MATERIAL TO CREATE A HEAT-TREATED COMBINATION OF BETAINE AND PH ADJUSTING MATERIAL OPERATION 311 is allowed to cool in the treatment vessel of TRANSFER THE RAW COMBINATION OF BETAINE AND PH ADJUSTING MATERIAL INTO A TREATMENT VESSEL OPERATION 309.

As noted, in one embodiment, the cooling at COOL THE HEAT-TREATED COMBINATION OF BETAINE AND PH ADJUSTING MATERIAL TO YIELD A PH ADJUSTED BETAINE BASED ORGANIC FERTILIZER PRODUCT OPERATION 313 yields the resulting pH adjusted betaine based organic fertilizer product.

In one embodiment, once the heat-treated combination of betaine and pH adjusting material is cooled at COOL THE HEAT-TREATED COMBINATION OF BETAINE AND PH ADJUSTING MATERIAL TO YIELD A PH ADJUSTED BETAINE BASED ORGANIC FERTILIZER PRODUCT OPERATION 313 to yield the pH adjusted betaine based organic fertilizer product, process flow proceeds to DELIVER AND/OR APPLY THE PH ADJUSTED BETAINE BASED ORGANIC FERTILIZER PRODUCT OPERATION 315.

In one embodiment, at DELIVER AND/OR APPLY THE PH ADJUSTED BETAINE BASED ORGANIC FERTILIZER PRODUCT OPERATION 315 the pH adjusted betaine based organic fertilizer product is transferred in bulk to a tanker truck and/or transferred into drums for delivery of smaller quantities of the pH adjusted betaine based organic fertilizer product. In one embodiment, at DELIVER AND/OR APPLY THE PH ADJUSTED BETAINE BASED ORGANIC FERTILIZER PRODUCT OPERATION 315, the pH adjusted betaine based organic fertilizer product is then delivered to farms for application to agricultural vegetation.

In one embodiment, at DELIVER AND/OR APPLY THE PH ADJUSTED BETAINE BASED ORGANIC FERTILIZER PRODUCT OPERATION 315 the pH adjusted betaine based organic fertilizer product is applied to pellets that can be applied/added directly to the agricultural vegetation and/or the fields/soil/substrate supporting the agricultural vegetation.

In one embodiment, at DELIVER AND/OR APPLY THE PH ADJUSTED BETAINE BASED ORGANIC FERTILIZER PRODUCT OPERATION 315, a quantity of the pH adjusted betaine based organic fertilizer product is offloaded into plastic field tanks located at or near the application site. In one embodiment, at DELIVER AND/OR APPLY THE PH ADJUSTED BETAINE BASED ORGANIC FERTILIZER PRODUCT OPERATION 315, the plastic field tanks are then used to feed the resulting pH adjusted betaine based organic fertilizer product into the irrigation stream either by direct injection or by vacuum drawing from the irrigation flow.

Depending on the particular agricultural vegetation requirements, the application rate of the resulting pH adjusted betaine based organic fertilizer product at DELIVER AND/OR APPLY THE PH ADJUSTED BETAINE BASED ORGANIC FERTILIZER PRODUCT OPERATION 315, may be anywhere in a range of approximately 5 to 400 gallons per acre.

In one embodiment, at DELIVER AND/OR APPLY THE PH ADJUSTED BETAINE BASED ORGANIC FERTILIZER PRODUCT OPERATION 315, the resulting pH adjusted betaine based organic fertilizer product may also be directly sprayed onto the agricultural vegetation without concerns of plant burning as may occur with more concentrated inorganic fertilizers.

In one embodiment, once the pH adjusted betaine based organic fertilizer product is delivered and applied at DELIVER AND/OR APPLY THE PH ADJUSTED BETAINE BASED ORGANIC FERTILIZER PRODUCT OPERATION 315, process flow proceeds to EXIT OPERATION 330 and process for creating a pH adjusted betaine based organic fertilizer product 300 is exited.

Using process for production of a pH adjusted betaine based organic fertilizer product 300, a pH adjusted betaine based organic fertilizer product is provided that is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

Figure 4:
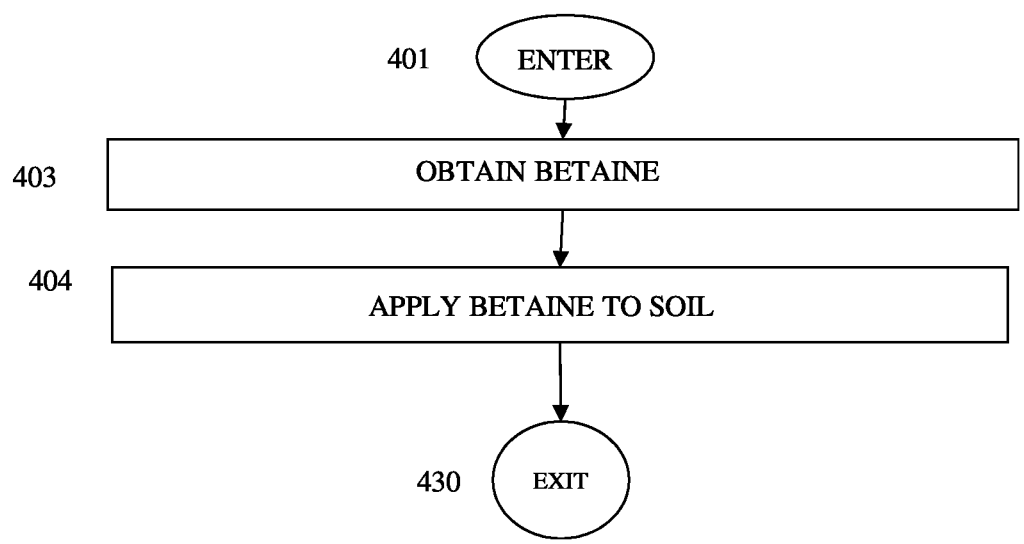
FIG. 4 is a flow chart of a method for altering soil pH using betaine in accordance with one embodiment.

In one embodiment, betaine is applied to soil to alter the soil pH. As shown in FIG. 4, a method for altering soil pH using betaine 400 begins at enter operation 401 and process flow proceeds to OBTAIN BETAINE OPERATION 403.

In one embodiment, after betaine is obtained at OBTAIN BETAINE OPERATION 403, process flow proceeds to APPLY BETAINE TO SOIL OPERATION 405. In one embodiment, at APPLY BETAINE TO SOIL OPERATION 405, at least a portion of the betaine obtained at OBTAIN BETAINE OPERATION 403 is applied to soil to alter the pH of the soil.

In one embodiment, after betaine is applied to soil at APPLY BETAINE TO SOIL OPERATION 405, process flow proceeds to EXIT OPERATION 430.

Using method for altering soil pH using betaine 400, soil pH is adjusted using betaine, which is benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more of the process steps and/or operations discussed herein. Consequently, the particular order and/or grouping of the process steps and/or operations discussed herein do not limit the scope of the invention as claimed below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A process of manufacturing a pH adjusted betaine based organic fertilizer product comprising:
   obtaining a quantity of betaine, wherein the betaine is an N-trimethylated amino acid and wherein the betaine is obtained from betaine by-product, wherein the betaine by-product is a by-product of a process for the de-sugaring of beet molasses;
   obtaining a quantity of corn steep liquor;
   obtaining a quantity of pH adjusting material;
   combining at least part of the quantity of betaine, at least part of the quantity of corn steep liquor, and at least part of the quantity of pH adjusting material to yield a raw combination of betaine, corn steep liquor, and pH adjusting material;
   heat treating the raw combination of betaine and pH adjusting material to at least 130 degrees F. for at least 4 hours to yield a heat-treated combination of betaine, corn steep liquor, and pH adjusting material; and
   cooling the heat-treated combination of betaine, corn steep liquor, and pH adjusting material to yield the pH adjusted betaine based organic fertilizer product.

2. The process of manufacturing the pH adjusted betaine based organic fertilizer product of claim 1, wherein the pH adjusting material includes at least one pH adjusting material selected from the group of pH adjusting materials consisting of:
   citric acid;
   acetic acid;
   grain by-products;
   wet distillers grains;
   dried distillers grains with solubles;
   fermented grain solubles; or
   corn condensed distillers solubles.

3. The process of manufacturing the pH adjusted betaine based organic fertilizer product of claim 1, wherein the pH adjusting material includes citric acid.

4. The process of manufacturing the pH adjusted betaine based organic fertilizer product of claim 1, wherein the pH adjusting material includes acetic acid.

5. The process of manufacturing the pH adjusted betaine based organic fertilizer product of claim 1, wherein;
   the pH adjusting material is a solid and/or semi-solid pH adjusting material.

6. The process of manufacturing the pH adjusted betaine based organic fertilizer product of claim 1, wherein;
   the pH adjusting material is a liquid pH adjusting material.

7. The process of manufacturing the pH adjusted betaine based organic fertilizer product of claim 1, wherein;
   combining at least part of the quantity of betaine, at least part of the quantity of corn steep liquor, and at least part of the quantity of pH adjusting material to yield a raw combination of betaine, corn steep liquor, and pH adjusting material comprises combining at least part of the quantity of betaine, at least part of the corn steep liquor, and at least part of the quantity of pH adjusting material to yield a raw combination of betaine, corn steep liquor, and pH adjusting material that is 0.5% to 99.5% betaine.

8. The process of manufacturing the pH adjusted betaine based organic fertilizer product of claim 1, wherein;
   combining at least part of the quantity of betaine, at least part of the quantity of corn steep liquor, and at least part of the quantity of pH adjusting material to yield a raw combination of betaine, corn steep liquor, and pH adjusting material comprises combining at least part of the quantity of betaine, at least part of the quantity of corn steep liquor, and at least part of the quantity of pH adjusting material to yield a raw combination of betaine, corn steep liquor, and pH adjusting material that is 0.5% to 20% pH adjusting material.

9. The process of manufacturing the pH adjusted betaine based organic fertilizer product of claim 1, further comprising:
   filtering the raw combination of betaine, corn steep liquor, and pH adjusting material using a filter having a standard wire mesh size number of 200.

10. The process of manufacturing the pH adjusted betaine based organic fertilizer product of claim 1, further comprising:
    filtering the raw combination of betaine, corn steep liquor, and pH adjusting material using a filter having a standard wire mesh size number in a range of 50 to 200.

11. The process of manufacturing the pH adjusted betaine based organic fertilizer product of claim 1, further comprising:
    filtering the heat-treated combination of betaine, corn steep liquor, and pH adjusting material using a filter having a standard wire mesh size number of 200.

12. The process of manufacturing the pH adjusted betaine based organic fertilizer product of claim 1, further comprising:

filtering the heat-treated combination of betaine, corn steep liquor, and pH adjusting material using a filter having a standard wire size number in a range of 50 to 200.

13. The process of manufacturing the pH adjusted betaine based organic fertilizer product of claim 1, wherein;
the betaine fertilizer product includes a nitrogen content in a range of 2 to 6 percent.

14. The process of manufacturing the pH adjusted betaine based organic fertilizer product of claim 1, wherein;
the betaine fertilizer product includes a phosphate content in a range of 0.5 to 2.5 percent.

15. The process of manufacturing the pH adjusted betaine based organic fertilizer product of claim 1, wherein;
the betaine fertilizer product includes a potassium content in a range of 1 to 7 percent.

16. A process for fertilizing a field comprising:
obtaining a quantity of betaine, wherein the betaine is an N-trimethylated amino acid, wherein the betaine is obtained from betaine by-product, wherein the betaine by-product is a by-product of a process for the de-sugaring of beet molasses;
obtaining a quantity of corn steep liquor;
combining at least part of the quantity of betaine and at least part of the quantity of corn steep liquor to yield a raw combination of betaine and corn steep liquor;
filtering the raw combination of betaine and corn steep liquor using a filter having a standard wire mesh size number of at least 50 to yield a pH adjusted betaine based organic fertilizer product; and
applying the pH adjusted betaine based organic fertilizer product to agricultural vegetation.

17. The process for fertilizing agricultural vegetation of claim 16, wherein;
combining at least part of the quantity of betaine and at least part of the quantity of corn steep liquor to yield a raw combination of betaine and corn steep liquor comprises combining at least part of the quantity of betaine and at least part of the quantity of corn steep liquor to yield a raw combination of betaine and corn steep liquor that is 0.5% to 99.5% betaine.

18. The process for fertilizing agricultural vegetation of claim 16, wherein;
combining at least part of the quantity of betaine and at least part of the quantity of corn steep liquor to yield a raw combination of betaine and corn steep liquor comprises combining at least part of the quantity of betaine and at least part of the quantity of corn steep liquor to yield a raw combination of betaine and corn steep liquor that is 0.5% to 20% corn steep liquor.

19. The process for fertilizing agricultural vegetation of claim 16, further comprising:
heat treating the raw combination of betaine and corn steep liquor, wherein heat treating the raw combination of betaine and corn steep liquor includes heating the raw combination of betaine and corn steep liquor to 130 degrees F. for at least 4 hours.

20. The process for fertilizing agricultural vegetation of claim 16, further comprising:
heat treating the raw combination of betaine and corn steep liquor, wherein heat treating the raw combination of betaine and corn steep liquor includes heating the raw combination of betaine and corn steep liquor to a range of about 130 to 200 degrees F. for 4 to 120 hours.

21. The process for fertilizing agricultural vegetation of claim 16, wherein;
the pH adjusted betaine based organic fertilizer product includes a nitrogen content in a range of 2 to 6 percent.

22. The process for fertilizing agricultural vegetation of claim 16, wherein;
the pH adjusted betaine based organic fertilizer product includes a phosphate content in a range of 0.5 to 2.5 percent.

23. The process for fertilizing agricultural vegetation of claim 16, wherein;
the pH adjusted betaine based organic fertilizer product includes a potassium content in a range of 1 to 7 percent.

24. The process for fertilizing agricultural vegetation of claim 16, wherein;
applying the pH adjusted betaine based organic fertilizer product to the agricultural vegetation comprises applying the pH adjusted betaine based organic fertilizer product at a rate of 5 to 400 gallons per acre.

25. A method for organic fertilization of agricultural vegetation using betaine comprising:
obtaining a quantity of betaine, wherein the betaine is an N-trimethylated amino acid and wherein the betaine is obtained from betaine by-product, wherein the betaine by-product is a by-product of a process for the de-sugaring of beet molasses;
obtaining a quantity of citric acid;
creating a pH adjusted betaine based organic fertilizer product using the betaine and the citric acid; and
applying the pH adjusted betaine based organic fertilizer product to agricultural vegetation.

26. The method for organic fertilization of agricultural vegetation using betaine of claim 25 wherein the pH adjusted betaine based organic fertilizer product is greater than 90% betaine.

27. The method for organic fertilization of agricultural vegetation using betaine of claim 25 wherein the pH adjusted betaine based organic fertilizer product is applied/added directly to the agricultural vegetation and/or fields and/or soil and/or substrate supporting the agricultural vegetation.

28. The method for organic fertilization of agricultural vegetation using betaine of claim 25 wherein the pH adjusted betaine based organic fertilizer product is applied/added to an irrigation system servicing the agricultural vegetation.

29. The method for organic fertilization of agricultural vegetation using betaine of claim 25 wherein the pH adjusted betaine based organic fertilizer product is added to a liquid base to obtain a desired concentration of betaine.

30. The method for organic fertilization of agricultural vegetation using betaine of claim 25 wherein the pH adjusted betaine based organic fertilizer product is added to a semi-liquid base to achieve a desired concentration of betaine.

31. The method for organic fertilization of agricultural vegetation using betaine of 29 wherein the desired concentration of betaine is 20% to 60%.

32. The method for organic fertilization of agricultural vegetation using betaine of claim 25 wherein the pH adjusted betaine based organic fertilizer product is added to one or more solids or semi-solids to achieve a desired concentration of betaine.

33. The method for organic fertilization of agricultural vegetation using betaine of claim 25 wherein applying the pH adjusted betaine based organic fertilizer product to agricultural vegetation includes applying the pH adjusted betaine based organic fertilizer product at a rate of 5 to 400 gallons per acre.

34. The method for organic fertilization of agricultural vegetation using betaine of claim 25 wherein applying the pH adjusted betaine based organic fertilizer product to agricultural vegetation includes applying the pH adjusted betaine based organic fertilizer product directly to the agricultural vegetation.

35. The method for organic fertilization of agricultural vegetation using betaine of claim 25 wherein the pH adjusted betaine based organic fertilizer product is created by applying/adding the obtained betaine directly to the agricultural vegetation and/or fields and/or soil and/or substrate supporting the agricultural vegetation.

36. The method for organic fertilization of agricultural vegetation using betaine of claim 25 wherein the pH adjusted betaine based organic fertilizer product is created by adding the obtained betaine to an irrigation system servicing the agricultural vegetation.

37. A process of manufacturing a pH adjusted betaine based organic fertilizer product comprising:
  obtaining a quantity of betaine, wherein the betaine is an N-trimethylated amino acid and wherein the betaine is obtained from betaine by-product, wherein the betaine by-product is a by-product of a process for the de-sugaring of beet molasses;
  obtaining a quantity of corn steep liquor;
  combining at least part of the quantity of betaine and at least part of the quantity of corn steep liquor to yield the pH adjusted betaine based organic fertilizer product.

38. The process of manufacturing the pH adjusted betaine based organic fertilizer product of claim 37, further comprising:
  obtaining a quantity of pH adjusting material;
  combining at least part of the quantity of pH adjusting material with at least part of the quantity of betaine and at least part of the quantity of corn steep liquor to yield a raw combination of betaine, corn steep liquor, and pH adjusting material to yield the pH adjusted betaine based organic fertilizer product.

39. The process of manufacturing the pH adjusted betaine based organic fertilizer product of claim 38, wherein the pH adjusting material includes at least one pH adjusting material selected from the group of pH adjusting materials consisting of:
  citric acid;
  acetic acid;
  grain by-products;
  wet distillers grains;
  dried distillers grains with solubles;
  fermented grain solubles; or
  corn condensed distillers solubles.

40. The process of manufacturing the pH adjusted betaine based organic fertilizer product of claim 38, wherein the pH adjusting material includes citric acid.

41. The process of manufacturing the pH adjusted betaine based organic fertilizer product of claim 38, wherein the pH adjusting material includes acetic acid.

42. The process of manufacturing the pH adjusted betaine based organic fertilizer product of claim 38, wherein;
  the pH adjusting material is a solid and/or semi-solid pH adjusting material.

43. The process of manufacturing the pH adjusted betaine based organic fertilizer product of claim 38, wherein;
  the pH adjusting material is a liquid pH adjusting material.

44. The process of manufacturing the pH adjusted betaine based organic fertilizer product of claim 37, wherein the pH adjusted betaine based organic fertilizer product is 0.5% to 99.5% betaine.

45. The process of manufacturing the pH adjusted betaine based organic fertilizer product of claim 37, wherein the pH adjusted betaine based organic fertilizer product is 0.5% to 20% corn steep liquor.

46. The process of manufacturing the pH adjusted betaine based organic fertilizer product of claim 37, wherein combining at least part of the quantity of betaine and at least part of the quantity of corn steep liquor further comprises
  filtering the combination of betaine and corn steep liquor using a filter having a standard wire mesh size number of 200.

47. The process of manufacturing the pH adjusted betaine based organic fertilizer product of claim 37, wherein combining at least part of the quantity of betaine and at least part of the quantity of corn steep liquor further comprises
  filtering the combination of betaine and corn steep liquor using a filter having a standard wire mesh size number in a range of 50 to 200.

48. The process of manufacturing the pH adjusted betaine based organic fertilizer product of claim 37, wherein;
  the betaine fertilizer product includes a nitrogen content in a range of 2 to 6 percent.

49. The process of manufacturing the pH adjusted betaine based organic fertilizer product of claim 37, wherein;
  the betaine fertilizer product includes a phosphate content in a range of 0.5 to 2.5 percent.

50. The process of manufacturing the pH adjusted betaine based organic fertilizer product of claim 37, wherein;
  the betaine fertilizer product includes a potassium content in a range of 1 to 7 percent.

* * * * *

UNITED STATES PATENT AND TRADEMARK OFFICE
CERTIFICATE OF CORRECTION

PATENT NO. : 9,815,744 B2
APPLICATION NO. : 14/863984
DATED : November 14, 2017
INVENTOR(S) : Jacob Matthew Evans It is certified that error appears in the above-identified patent and that said Letters Patent is hereby corrected as shown below:

In the Claims

In Column 24, Line 56, Claim 31, between "betaine of" and "29", insert --Claim--.

Signed and Sealed this
Twenty-eighth Day of February, 2023

Katherine Kelly Vidal
*Director of the United States Patent and Trademark Office*